US012697633B2

(12) United States Patent
Shazuki

(10) Patent No.: US 12,697,633 B2
(45) Date of Patent: Aug. 4, 2026

(54) ACCUMULATOR SPRAYER

(71) Applicant: CANYON CORPORATION, Tokyo (JP)

(72) Inventor: Mitsuaki Shazuki, Sanyo Onoda (JP)

(73) Assignee: CANYON CORPORATION, Tokyo (JP)

( * ) Notice: Subject to any disclaimer, the term of this patent is extended or adjusted under 35 U.S.C. 154(b) by 102 days.

(21) Appl. No.: 18/860,754

(22) PCT Filed: Apr. 25, 2023

(86) PCT No.: PCT/JP2023/016206

§ 371 (c)(1),
(2) Date: Oct. 28, 2024

(87) PCT Pub. No.: WO2023/210611

PCT Pub. Date: Nov. 2, 2023

(65) Prior Publication Data

US 2025/0296105 A1 Sep. 25, 2025

(30) Foreign Application Priority Data

Apr. 29, 2022 (JP) ................................ 2022-075601

(51) Int. Cl.
*B05B 11/10* (2023.01)

(52) U.S. Cl.
CPC ....... *B05B 11/1022* (2023.01); *B05B 11/1011* (2023.01); *B05B 11/1057* (2023.01); *B05B 11/1074* (2023.01)

(58) Field of Classification Search
CPC ............ B05B 11/1022; B05B 11/1011; B05B 11/1057; B05B 11/1074
See application file for complete search history.

(56) References Cited

U.S. PATENT DOCUMENTS

| | | | | |
|---|---|---|---|---|
| 9,962,724 | B2 * | 5/2018 | Fujiwara | B05B 11/1002 |
| 10,512,925 | B2 * | 12/2019 | Nakano | B05B 15/20 |
| 12,246,333 | B2 * | 3/2025 | Liang | B05B 11/007 |

(Continued)

FOREIGN PATENT DOCUMENTS

| | | | |
|---|---|---|---|
| JP | 2002-11389 | A | 1/2002 |
| JP | 2022104727 | A | 7/2022 |
| JP | 2022104728 | A | 7/2022 |

*Primary Examiner* — Paul R Durand
*Assistant Examiner* — Randall A Gruby
(74) *Attorney, Agent, or Firm* — Muncy, Geissler, Olds & Lowe, P.C.

(57) ABSTRACT

An accumulator sprayer X comprises a cylinder body portion B having a main cylinder portion B1 and a sub-cylinder portion B2, and a cover portion C attached to cover the cylinder body portion B. The accumulator sprayer is attached to a container J to suck up liquid in container J to the main cylinder portion via a first valve FV, apply pressure to the liquid in the main cylinder portion, and spray the liquid from a nozzle portion F via a valve structure A when the pressure exceeds a certain pressure, and the valve structure is mounted between a lower support portion B23 of the sub-cylinder portion and an upper support portion C1 of the cover portion, and a length L1 of the valve structure in unloaded state and a shortest distance L2 between the lower support portion and the upper support portion satisfy the relational expression L1<L2.

4 Claims, 7 Drawing Sheets

(56) References Cited

U.S. PATENT DOCUMENTS

| | | | | |
|---|---|---|---|---|
| 2019/0217317 | A1* | 7/2019 | Shazuki | B05B 11/0075 |
| 2025/0296105 | A1* | 9/2025 | Shazuki | B05B 11/1011 |
| 2025/0367693 | A1* | 12/2025 | Shazuki | B05B 11/1011 |

* cited by examiner

ACCUMULATOR SPRAYER

TECHNICAL FIELD

The present invention relates to an accumulator sprayer and, in more detail, to an accumulator sprayer that eliminates the pressing force (i.e., initial set pressure) applied to a valve structure when a trigger is not pulled (initial set state, i.e., when the valve is not open), and thereby suppresses deformation of the valve structure.

BACKGROUND ART

Today, an accumulator sprayer including a trigger for spraying liquid are widely known.

This accumulator spray is configured to increase the pressure of the liquid inside a cylinder by pulling back the trigger and sliding a piston against the cylinder, and then to forcefully spray the liquid inside the cylinder out of the nozzle when the pressure exceeds a certain level.

More specifically, the cylinder is located between two one-way valves (i.e. a first valve and a second valve), and when the accumulated pressure of the liquid in the cylinder, which has been introduced via the first valve, exceeds a certain level, a space between a valve body and a valve seat of the second valve is released and the valve is opened, then the liquid is forcefully pushed out of the cylinder and sprayed outwards via the nozzle.

In this case, the valve body of the second valve is always pressed against the valve seat by the resilient force of a spring, and when the fluid pressure inside the cylinder exceeds the resilient force in a state in which the first valve is closed, the second valve opens and the fluid passes through forcefully.

When the liquid is sprayed from the nozzle and the pressure inside the cylinder is released, the resilient force becomes stronger than the liquid pressure, and the spring presses the valve body against the valve seat, causing the second valve to close again.

The accumulator sprayer including the trigger is useful because it can forcefully splay the liquid in the cylinder to the outside in this manner.

As for such accumulator sprayer, for example, several types have been developed by the applicant.

For example, the invention in PTL 1 is a trigger sprayer for sucking up and splay liquid in a container, and has a second valve that opens and closes according to the pressure of the liquid, and the second valve has a second valve piston portion and an inverted-dome-shaped dome spring portion for applying force to the second valve piston portion. The invention of PTL 2 is similar.

CITATION LIST

Patent Literature

PTL 1: Japanese Patent Application No. 2020-219863
PTL 1: Japanese Patent Application No. 2020-219864

SUMMARY OF INVENTION

Technical Problem

In the valve structures described in PTL 1 and PTL 2, it is normal that even when the trigger is not pulled (initial set state, i.e., a state in which the valve is not open), the spring portion presses the valve body against the valve seat and the second valve is closed.

Here, the pressing force applied to the valve body in the initial set state is referred to as the "initial set pressure."

That is, the spring portion is always loaded by a certain initial set pressure even in the initial set state, which causes plastic deformation of the spring portion. When the spring portion is distorted due to plastic deformation, the resilient force of the spring portion itself is degraded and the valve becomes less tight, resulting in inappropriate liquid spraying and leakage.

The present invention was developed in response to the above-mentioned problem. That is, the purpose of the present invention is to provide an accumulator sprayer that can eliminate the initial set pressure applied to the spring portion in the initial set state and thereby suppress plastic deformation of the valve structure (valve body) containing the spring portion as much as possible.

Solution to Problems

The present inventors have conducted extensive research and has found that the above problem can be solved by making the length L1 of the valve structure in unloaded state and the shortest distance L2 between a lower support portion and an upper support portion to which the valve structure is attached satisfy the relationship L1<L2. The present invention is based on this finding.

The present invention resides in an accumulator sprayer mounted with a valve structure, wherein the valve structure is mounted so as not to contact at least one of an upper support portion, which is a portion supporting the valve structure on the upper side, and a lower support portion, which is a portion supporting the valve structure on the lower side, in an initial set state.

The present invention resides in an accumulator sprayer X comprising a cylinder body portion B having a main cylinder portion B1 and a sub-cylinder portion B2, and a cover portion C attached to cover the cylinder body portion B, wherein the accumulator sprayer X is attached to a container J to suck up liquid in the container J to the main cylinder portion B1 via a first valve FV, apply pressure to the liquid in the main cylinder portion B1, and spray the liquid from a nozzle portion F via the valve structure A when the pressure exceeds a certain pressure, and the valve structure A is mounted between a lower support portion B23 of the sub-cylinder portion B2 and an upper support portion C1 of the cover portion C, and a length L1 of the valve structure A in unloaded state and a shortest distance L2 between the lower support portion B23 and the upper support portion C1 satisfy the relational expression L1<L2.

The present invention resides in the above-described accumulator sprayer X, wherein the valve structure A is composed of a reverse-dome-shaped spring portion 1 and a valve piston portion 2 hanging down from the spring portion 1, and the valve piston portion 2 is composed of a core rod portion 21, an outer skirt portion 22 extending downward from the outer circumference of the core rod portion 21, and an inner skirt portion 23 longer than the outer skirt portion 22.

The present invention resides in the above-described accumulator sprayer X, wherein the core rod portion 21 is formed cylindrically between the spring portion 1 and the outer skirt portion 22.

The present invention resides in the above-described accumulator sprayer X, wherein a tubular protrusion 1A is formed in the center of the spring portion 1.

The present invention resides in the above-described accumulator sprayer X, wherein a center hole 1B whose top is open is formed in the valve piston portion 2.

Advantageous Effects of Invention

The accumulator sprayer X of the present invention can reduce the initial set pressure and thereby suppress the plastic deformation of the valve structure as much as possible since the valve structure is mounted so as not to contact at least one of the upper support portion and the lower support portion in the initial set state.

The accumulator sprayer X of the present invention can set the pressing force applied to the valve piston portion 2 in the initial set state to zero (i.e., set the initial set pressure to zero) since the length L1 of the valve structure A in unloaded state and the shortest distance L2 between the lower support portion B23 and the upper support portion C1, the valve structure A is mounted therebetween, satisfy the relational expression L1<L2. Therefore, the load applied to the valve structure A in the initial set state is reduced, and its plastic deformation can be suppressed as much as possible.

Note that the unloaded state described herein is the state in which the valve structure A is not pressed neither in a valve-opening direction nor a valve-closing direction.

In the accumulator sprayer X of the present invention, since the valve structure A is composed of a reverse-dome-shaped spring portion 1 and a valve piston portion 2 hanging down from the spring portion 1, the resilient force of the spring portion 1 is applied evenly to the valve piston portion 2. Therefore, the pressing force can be transmitted properly, the axial center of the valve piston portion 2 is stabilized, and lateral movement during vertical movement is prevented.

In the accumulator sprayer X of the present invention, since the core rod portion 21 is formed cylindrically between the spring portion 1 and the outer skirt portion 22, when the valve structure A moves upward and downward, no obstacle contacts with the wall surface of the sub-cylinder portion B2 and its movement is not interfered, therefore the opening and closing of the valve is smoothly performed by the valve structure A.

In the accumulator sprayer X of the present invention, since the tubular protrusion 1A is formed in the center of the spring portion 1, when the valve structure A comes up to an upper dead point, the deformation of the spring portion 1 is suppressed within a certain range, thereby the load applied to the spring portion 1 can be reduced.

In the accumulator sprayer X of the present invention, since the center hole 1B whose top is open is formed in the valve piston portion 2, the weight of the valve structure A can be reduced. In addition, axial bending is prevented when the valve structure A is pressed.

In addition, excessive bending deformation can be suppressed, and in extreme cases, the spring portion 1 can be prevented from being flipped inside out. As a result, opening and closing of the valve by the valve structure A is smoothly performed.

DESCRIPTION OF EMBODIMENTS

Figure 1:
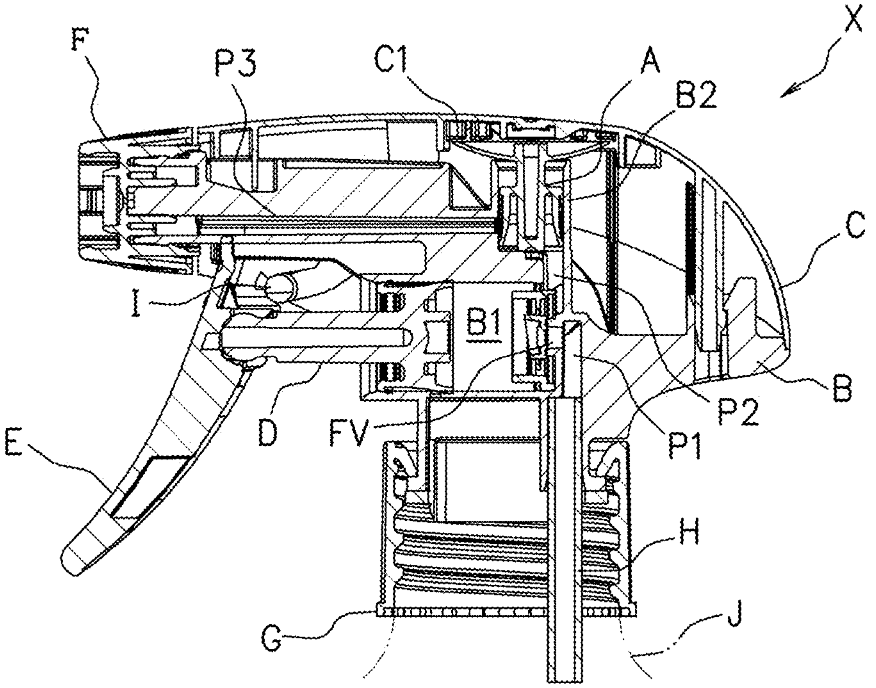
FIG. 1 is a longitudinal sectional view showing an accumulator sprayer of the present invention.

In the following, with reference to the drawings as required, a preferred embodiment of the present invention is described in detail.

Note in the drawings that the same components are provided with the same reference numeral and redundant description is omitted.

Also, relations in position such as above, below, left, and right are assumed to be based on the position relation depicted in the drawings unless otherwise specified.

Furthermore, the dimensional ratios of the drawings are not limited to the ratios depicted in the drawings.

The accumulator sprayer X of the present invention is attached to a container J, sucks up liquid in the container J into a main cylinder portion B1 via a first valve FV, applies pressure to the liquid in the main cylinder portion B1, and when the liquid pressure exceeds a certain pressure, the liquid is sprayed forcefully from a nozzle portion F via the valve structure A.

Figure 2:
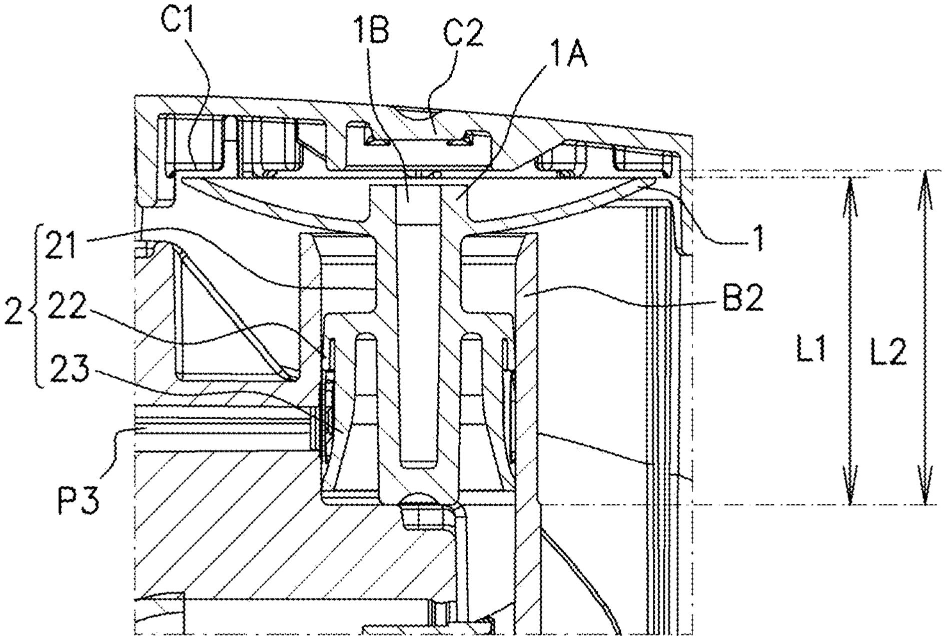
FIG. 2 is an enlarged longitudinal sectional view showing the valve structure in the state shown in FIG. 1.

FIG. 1 is a longitudinal sectional view showing an accumulator sprayer of the present invention. FIG. 2 is an enlarged longitudinal sectional view showing the valve structure in the state shown in FIG. 1.

The accumulator sprayer X includes the nozzle portion F, a cylinder body portion B (including the main cylinder portion B1, a sub-cylinder portion B2, a first passage portion P1, a second passage portion P2, and a third passage portion P3, etc.), a piston portion D, a cover portion C, a trigger portion E, the first valve FV, a second valve, an introduction tube H, a trigger-returning spring I, and a cap portion G.

The cylinder body portion B is a portion that has a passage through which the liquid flows, and includes the main cylinder portion B1 for accommodating the piston portion D, the first passage portion P1 for introducing the liquid from the container J into the main cylinder portion B1, the second passage portion P2 for introducing the liquid from the main cylinder portion B1 into the sub-cylinder portion B2 to which the valve structure A is attached, and the third passage portion P3 for introducing the liquid from the sub-cylinder portion B2 into the nozzle portion F.

The introduction tube H is cylindrical shape and is fitted below the cylinder body portion B. The introduction tube H is connected to the main cylinder portion B1 via the first passage portion P1.

The main cylinder portion B1 is a cylindrical shaped member. The piston portion D that slides inside the main cylinder portion B1 in conjunction with the movement of the trigger portion E is inserted in the main cylinder portion B1.

The first valve FV is provided between the main cylinder portion B1 and the first passage portion P1.

The first valve FV is a one-way valve that allows the liquid to pass from the first passage portion P1 into the main cylinder portion B1.

The main cylinder portion B1 is connected to the sub-cylinder portion B2 via the second passage portion P2.

The sub-cylinder portion B2 is formed in a cylindrical shape whose top is open. The valve structure A is attached to the sub-cylinder portion B2. Specifically, the bottom portion of the sub-cylinder portion B2 is a lower support portion B23 which supports the valve structure A, and the valve structure A is placed on the lower support portion B23.

Here, as described below, the inner wall of the sub-cylinder portion B2 functions as the valve seat, and the valve piston portion 2 of the valve structure A, more specifically an inner skirt portion 23, functions as the valve body, thereby so-called second valve is formed.

On the nozzle portion F side of the sub-cylinder portion B2, a longitudinal groove portion B21 and a through hole B22, which will be described later, are provided, and the through hole B22 is contact with the third passage portion P3.

Note that a flange portion is provided at a lower end of the cylinder body portion B (see FIG. 1), and by sandwiching this flange portion by the upper end portion of the container J and the cap portion G, the accumulator sprayer X is fixed to the container J.

The cover portion C is mounted so as to cover the entire cylinder body portion B. In the condition that the cover portion C is attached to the cylinder body portion B, a space is created between the cover portion C and the sub-cylinder portion B2 of the cylinder body portion B, and the valve structure A is attached in the space.

An upper support portion C1 is provided in the cover portion C for supporting the valve structure A. This upper support portion C1 is a portion of the inner upper wall of the cover portion C that supports the upper end outer circumference of the spring portion 1.

Figure 3:
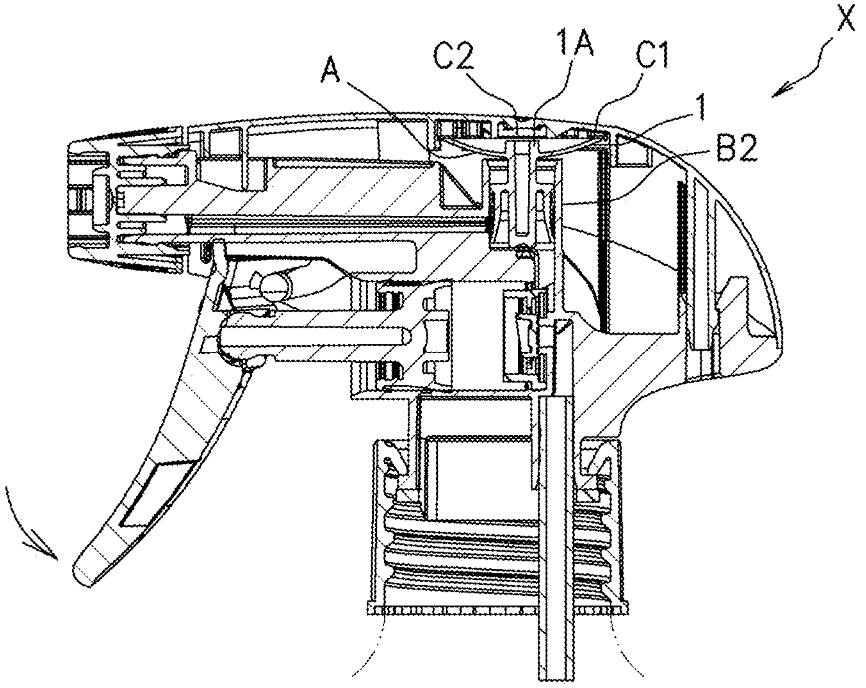
FIG. 3 is a longitudinal sectional view showing the accumulator sprayer in the state that the valve structure moves upward.

FIG. 3 is a longitudinal sectional view showing the accumulator sprayer X in the state that the valve structure A moves upward.

Figure 4:
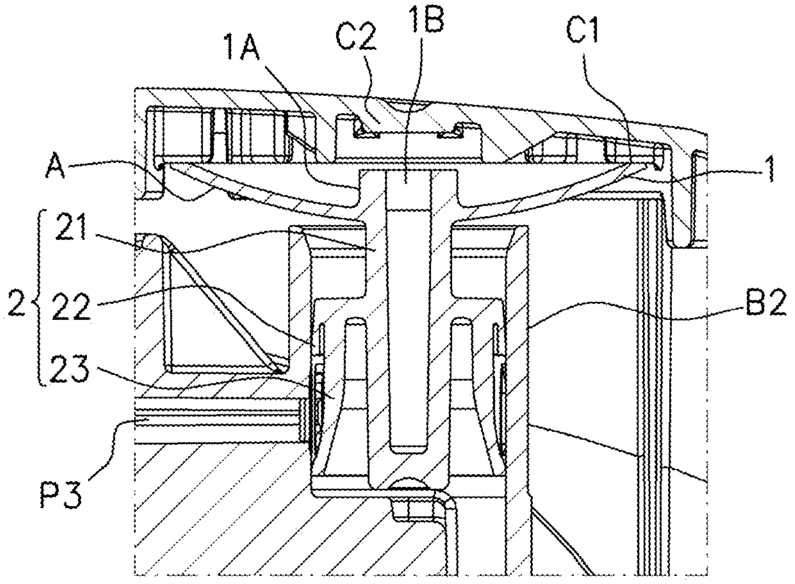
FIG. 4 is an enlarged longitudinal sectional view showing the valve structure in the state shown in FIG. 3.

FIG. 4 is an enlarged longitudinal sectional view showing the valve structure A in the state shown in FIG. 3.

When the valve piston portion 2 moves upward, the spring portion 1 contacts with the upper support portion C1 as shown in FIG. 4. Furthermore, the valve piston portion 2 moves upward and the spring portion 1 deforms, thereby pressing force is applied against the valve piston portion 2.

The valve structure A is formed of the inverted-dome-shaped spring portion 1 and the valve piston portion 2 drooping from the spring portion 1. Specifically, the cylindrical core rod portion 21 droops down from the approximately center of the spring portion 1, and an outer skirt portion 22 extending downward is formed continuously with the outer circumference of the core rod portion 21.

Furthermore, a skirt portion extending downward longer than the outer skirt portion 22 is formed inside the outer skirt portion 22. That is, the core rod portion 21, the outer skirt portion 22 and the inner skirt portion 23 forms the valve piston portion 2.

Since the valve structure A is formed by the inverted-dome-shaped spring portion 1 and the valve piston portion 2 drooping from the spring portion 1, the resilient force of the spring portion 1 is applied evenly to the valve piston portion 2. Therefore, the pressing force caused by the spring portion 1 can be transmitted properly, the axial center of the valve piston portion 2 is stabilized, and lateral movement during vertical movement is prevented.

Moreover, in the accumulator sprayer X, since the core rod portion 21 between the spring portion 1 and the outer skirt portion 22 is formed cylindrically between the spring portion 1 and the outer skirt portion 22, when the valve structure A moves upward and downward, no obstacle contacts with the wall surface of the sub-cylinder portion B2 and its movement is not interfered, therefore the opening and closing of the valve is smoothly performed by the valve structure A.

Both the outer skirt portion 22 and the inner skirt portion 23 are formed in tapered shape, with their lower portion expanding outward.

As described later, the outer skirt portion 22 performs the sealing function, and the inner skirt portion 23 serves as a valve body.

The upper end of the core rod portion 21 is open and a center hole 1B is formed.

The periphery of the opened center hole 1B is convex and forms a tubular protrusion 1A. That is, the center hole 1B and the tubular protrusion 1A are formed in approximately center of the spring portion 1.

As mentioned later, the tubular protrusion 1A serves as a stopper of the valve structure A, which functions as a valve body.

In the accumulator sprayer X, since the center hole 1B whose top is open is formed in the valve piston portion 2, the weight of the valve structure A can be reduced.

In addition, axial bending is prevented when the valve structure A is pressed.

In addition, excessive deformation can be suppressed, and in extreme cases, the spring portion 1 can be prevented from being flipped inside out.

As a result, opening and closing of the valve by the valve structure A is smoothly performed.

In the accumulator sprayer X, the valve structure A is attached to the sub-cylinder portion B2. As mentioned above, the sub-cylinder portion B2 is formed in a cylindrical shape whose top is open, and the valve structure A is attached so that the outer skirt portion 22 and the inner skirt portion 23 press the inner wall of the sub-cylinder portion B2. At this time, the valve structure A is placed on the lower support portion B23 formed at the bottom portion of the sub-cylinder portion B2.

The length L1 of the valve structure A in the unloaded state is longer than the wall portion of the sub-cylinder portion, and its upper end (i.e., the spring portion 1) is supported by the upper support portion C1 of the cover portion C.

Here, in the initial set state, the valve structure A is mounted in the sub-cylinder portion B2 so as not to contact with the upper support portion C1.

In other words, the length L1 of the valve structure A in unloaded state and the shortest distance L2 between the lower support portion B23 and the upper support portion C1 satisfy the relation of L1<L2. That is, in the initial set state, the valve structure A is mounted in the sub-cylinder portion B2 in the non-contact condition with the upper support portion C1.

Accordingly, the initial set pressure in the initial set state becomes zero.

Therefore, the load applied to the spring portion 1 can be reduced, and plastic deformation of the valve structure A can be suppressed.

The upper support portion C1 of the cover portion C is a portion to which the spring portion 1 contacts in the inner wall of the cover portion C. In the cover portion C, a convex stopper portion C2 is provided at a position corresponding to the tubular protrusion 1A. The stopper portion C2 for restricting the upward movement of the valve structure A.

When the valve structure A moves upward and the spring portion 1 is pressed and deformed, the tubular protrusion 1A moves upward as well and contacts with the stopper portion C2 to stop the valve structure A from moving.

This prevents the spring portion 1 from bending deformation caused by excess stress to the valve structure A when the valve structure A reaches to the upper dead point, and in extreme cases, prevents the spring portion 1 from being flipped inside out.

Since the valve structure A is even in circumferential direction in the top view, it can contact the upper support portion C1 of the cover portion C evenly and receive the reaction force equally.

In the valve structure A, the spring portion 1 and the valve piston portion 2 are integrally formed.

Figure 5:
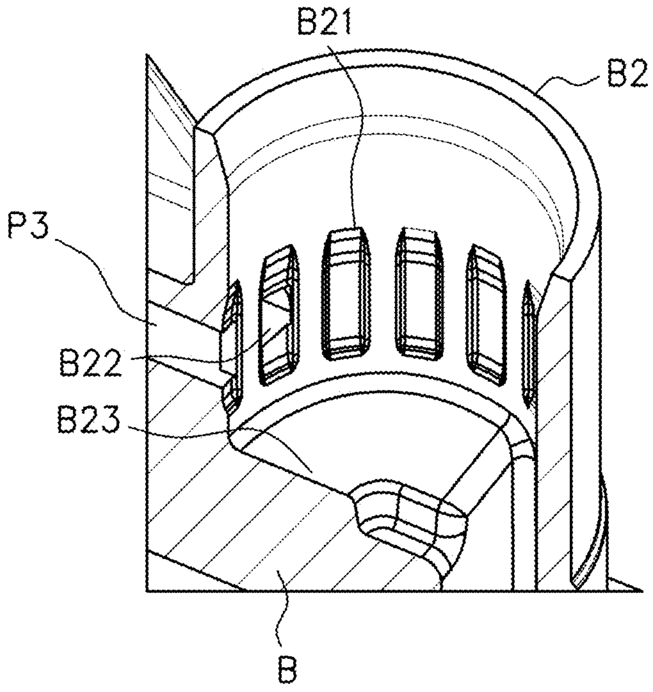
FIG. 5 is a drawing to illustrate an inner circumferential wall of a sub-cylinder portion.

FIG. 5 is a drawing to illustrate an inner circumferential wall of a sub-cylinder portion.

In the inner circumferential wall of the sub-cylinder portion B2, a plurality of concave longitudinal groove portions B21 are provided extending vertically in all directions and at regular intervals.

Of these, at the bottom of the longitudinal groove portion B21 provided at the position corresponding to the third passage portion P3 located on the nozzle portion F side, the through hole B22 contacting with the third passage portion P3 is provided. No thorough holes B22 are provided in the vertical groove portions B21 other than those corresponding to the nozzle portion F.

Between the longitudinal groove portions B21, the inner wall functions as a pillar. As a result, when pressure is applied to the valve piston portion 2, the area around the longitudinal groove portion B21 is not deformed, and the valve piston portion 2 slides smoothly.

The third passage portion P3 is provided at a certain distance from the bottom portion of the sub-cylinder portion B2. Specifically, it is provided at a height of 2 to 3 mm from the bottom portion.

This causes a time lag from the time the trigger portion E is turned from the initial set state and the valve piston portion 2 begins to move due to increased fluid pressure in the main cylinder portion B1 until the inner skirt portion 23 passes through the through hole B22 and the second valve opens.

Therefore, a state in which liquid is not sprayed out even when the trigger portion E is rotated (so-called "play") is caused, thus the usability of the accumulator sprayer X is improved.

Here, the flow of the liquid when using the accumulator sprayer X to splay the liquid is explained.

The liquid flows in the following order: the container J, the introduction tube H, the first passage portion P1, the first valve FV, the main cylinder portion B1, the second passage portion P2, the sub-cylinder portion B2, the vertical groove portion B21 (the through hole B22), the third passage portion P3 and the nozzle portion F, and is sprayed from the nozzle portion F to outside.

In the initial set state (in the state shown in FIG. 1 and FIG. 2), the first valve FV and the second valve are closed, and the liquid is filled from the introduction tube H to the sub-cylinder portion B2.

The trigger portion E is not rotated.

When the trigger portion E is rotated, the piston portion D moves in the main cylinder portion B1 in conjunction with the trigger portion E, and the pressure in the main cylinder portion B1 is increased (accumulated). At this time, the main cylinder portion B1 and the lower space of the valve piston portion 2 are connected via the second passage portion P2, and filled with the liquid.

When the liquid pressure increases sufficiently, the valve piston portion 2 moves upward as if pushed up by it, and the spring portion 1 is pressed and deformed (see FIG. 3 and FIG. 4).

Figure 6:
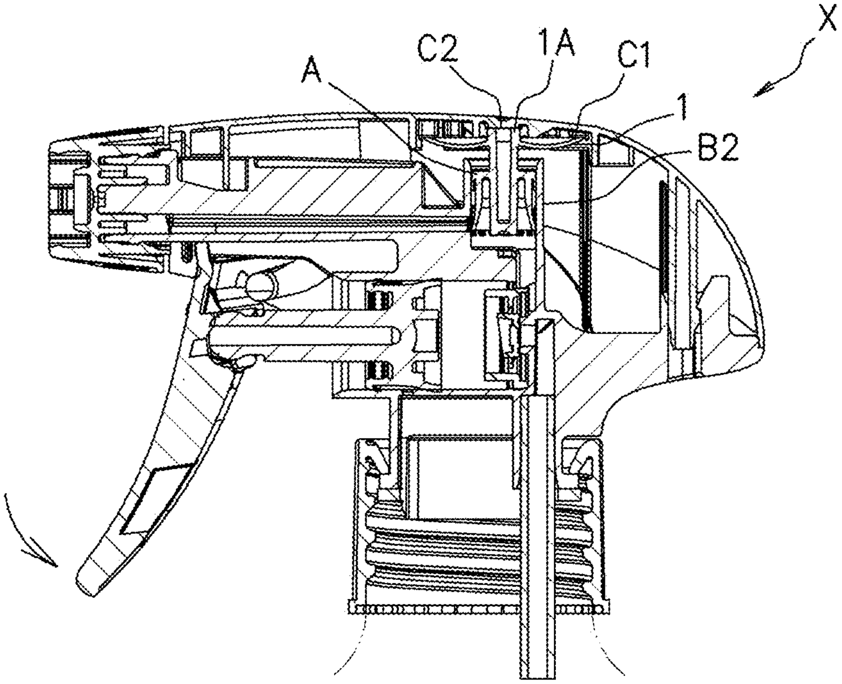
FIG. 6 is a longitudinal sectional view showing an accumulator sprayer in the state that the valve structure comes up to an upper dead point.

FIG. 6 is a longitudinal sectional view showing an accumulator sprayer X in the state that the valve structure A comes up to an upper dead point.

Figure 7:
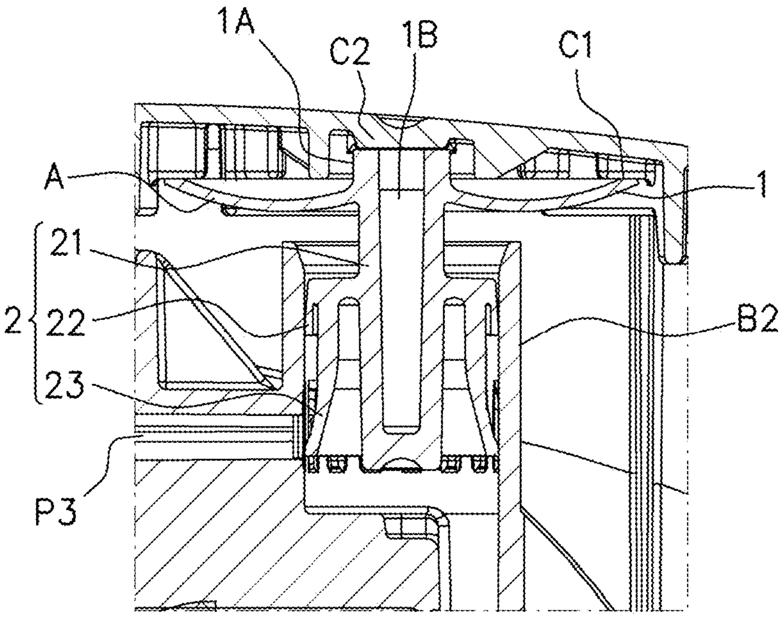
FIG. 7 is an enlarged longitudinal sectional view showing the valve structure in the state shown in FIG. 6.

FIG. 7 is an enlarged longitudinal sectional view showing the valve structure A in the state shown in FIG. 6.

When the valve structure A moves upward more due to the liquid pressure, the tubular protrusion 1A contacts with the stopper portion C2 as described above, thereby restricting the movement of the valve structure A.

Therefore, the valve structure A comes up to the upper dead point and the deformation of the spring portion 1 is suppressed within a certain range. As a result, the load on the spring portion 1 can be reduced and bending deformation etc. of the spring portion 1 can be suppressed.

When the valve piston portion 2 rises sufficiently, the through hole B22 of the vertical groove portion B21 and the third passage portion P3 are connected, and the liquid moves into the nozzle portion F. At this time, since the liquid is in a state of pressure-accumulated, it is sprayed forcefully from the nozzle portion F to outside.

Note that the first valve FV is closed in this time.

As the liquid is sprayed, the liquid pressure from the main cylinder portion B1 to the nozzle portion F decreases, and when the resilient force of the spring portion 1 overcomes this, the valve piston portion 2 is pushed down.

When the piston portion D is pushed down, the inner skirt portion 23 covers the third passage portion P3 and the second valve closes.

The trigger portion E is returned to its initial position by the spring force of the trigger-returning spring I.

In conjunction with the return of the trigger portion E, the piston portion D moves in the main cylinder portion B1, resulting in negative pressure in the main cylinder portion B1 and opening the first valve FV.

At this time, since there is a connection from the container J to the inside of the main cylinder portion B1, the liquid is sucked up by the negative pressure, from the container J into the main cylinder portion B1 through the introduction tube H and the first passage portion P1.

When the negative pressure in the main cylinder portion B1 is eliminated by the inflow of the liquid, the first valve FV closes and the liquid movement stops.

At this time, the second valve (the valve structure A) is in the closed state as described above.

Therefore, the accumulator sprayer X returns to the initial set state. At this time, both the first valve FV and the second valve are closed, and the liquid is filled from the introduction tube H to the sub-cylinder portion B2.

Note that, for the material of the cylinder body portion B formed by the main cylinder portion B1 and sub-cylinder portion B2, PP resin (polypropylene resin) or the like is preferably used.

Besides, for the material of the valve structure A, PP resin, POM resin (polyacetal resin) or the like is preferably used.

In the foregoing, while a preferred embodiment of the present invention has been described, the present invention is not meant to be limited to the above-described embodiment.

In this embodiment, the valve structure A is attached so as to contact with the lower support portion B23 and not to contact with the upper support portion C1, but the invention is not limited to this. The valve structure A may be attached so as to contact with only the upper support portion C1, to contact neither the upper support portion C1 nor the lower support portion B23.

As a result, no load is applied to the valve structure A in the axial direction (valve closing or opening direction) in the initial set state.

In this embodiment, the spring portion 1 and the valve piston portion 2 in the valve structure A are circular in top view, but this invention is not limited to this, and any appropriate shape that allows the spring portion 1 to press down the valve piston portion 2 can be adopted.

In this embodiment, the spring portion 1 and the valve piston portion 2 are integrally formed, but may be provided separately.

INDUSTRIAL APPLICABILITY

The accumulator sprayer X of the present invention can be widely used for spraying liquid by opening and closing of the first valve FV and the second valve, and by suppressing the deformation of the valve structure A, the function can be maintained for a long time and suitable spraying can be performed.

REFERENCE SIGNS LIST

X . . . accumulator sprayer
A . . . valve structure
1 . . . spring portion
1A . . . tubular protrusion
1B . . . central hole
2 . . . valve piston portion
21 . . . core rod portion
22 . . . outer skirt portion
23 . . . inner skirt portion
B . . . cylinder body portion
B1 . . . main cylinder portion
B2 . . . sub-cylinder portion
B21 . . . vertical groove portion
B22 . . . through hole
B23 . . . lower support portion
C . . . cover portion
C1 . . . upper support portion
C2 . . . stopper portion
D . . . piston portion
E . . . trigger portion
F . . . nozzle portion
G . . . cap portion
H . . . introduction tube
I . . . trigger-returning spring
J . . . container
FV . . . first valve
P1 . . . first passage portion
P2 . . . second passage portion
P3 . . . third passage portion

The invention claimed is:

1. An accumulator sprayer comprising a cylinder body portion having a main cylinder portion and a sub-cylinder portion, and a cover portion attached to cover the cylinder body portion, wherein the accumulator sprayer is attached to a container to suck up liquid in the container to the main cylinder portion via a first valve, apply pressure to the liquid in the main cylinder portion, and spray the liquid from a nozzle portion via a valve structure when a pressure exceeds a certain pressure, and the valve structure is mounted between a lower support portion of the sub-cylinder portion and an upper support portion of the cover portion, and a length L1 of the valve structure in unloaded state and a shortest distance L2 between the lower support portion and the upper support portion satisfy the relational expression $L1<L2$, wherein the valve structure is composed of a reverse-dome-shaped spring portion and a valve piston portion hanging down from the spring portion, and the valve piston portion is composed of a core rod portion, an outer skirt portion extending downward from the outer circumference of the core rod portion, and an inner skirt portion longer than the outer skirt portion.

2. The accumulator sprayer according to claim 1, wherein the core rod portion is formed cylindrically between the spring portion and the outer skirt portion.

3. The accumulator sprayer according to claim 1, wherein a tubular protrusion is formed in the center of the spring portion.

4. The accumulator sprayer according to claim 1, wherein a center hole whose top is open is formed in the valve piston portion.

* * * * *